US012785599B2

(12) United States Patent
Mohammad et al.

(10) Patent No.: US 12,785,599 B2
(45) Date of Patent: Nov. 3, 2026

(54) ONLY-STATIONARY-SIDE COMPENSATION NETWORK

(71) Applicant: BorgWarner Inc., Auburn Hills, MI (US)

(72) Inventors: Mostak Mohammad, Knoxville, TN (US); Randy H. Wiles, Strawberry Plains, TN (US); Emre Gurpinar, Knoxville, TN (US); Omer Onar, Knoxville, TN (US); Shajjad Chowdhury, Knoxville, TN (US); Jonathan Wilkins, Knoxville, TN (US)

(73) Assignee: BORGWARNER INC., Auburn Hills, MI (US)

( * ) Notice: Subject to any disclaimer, the term of this patent is extended or adjusted under 35 U.S.C. 154(b) by 214 days.

(21) Appl. No.: 18/305,713

(22) Filed: Apr. 24, 2023

(65) Prior Publication Data

US 2023/0344315 A1 Oct. 26, 2023

Related U.S. Application Data

(60) Provisional application No. 63/333,790, filed on Apr. 22, 2022.

(51) Int. Cl.

*H02K 11/04* (2016.01)
*H02P 27/06* (2006.01)
*H02K 11/27* (2016.01)
*H02K 11/33* (2016.01)

(52) U.S. Cl.

CPC .............. *H02P 27/06* (2013.01); *H02K 11/04* (2013.01); *H02K 11/27* (2016.01); *H02K 11/33* (2016.01)

(58) Field of Classification Search

CPC . H02M 2007/4818; H02M 2007/4815; H02M 2007/4811; H02M 1/4241; H02P 25/03

See application file for complete search history.

(56) References Cited

U.S. PATENT DOCUMENTS 8,542,085 B2 9/2013 Stancu et al.
9,257,226 B2 2/2016 Corl et al.
9,509,225 B2 11/2016 Stephens et al.
(Continued)

FOREIGN PATENT DOCUMENTS

JP 2010130777 A 6/2010
JP 2011002388 A 1/2011
(Continued)

OTHER PUBLICATIONS

Abdolkhani et al. "A novel detached magnetic coupling structure for contactless power transfer." IECON 2011—37th Annual Conference of the IEEE Industrial Electronics Society. IEEE, 2011. 6 pages.

(Continued)

*Primary Examiner* — Bryan R Perez
(74) *Attorney, Agent, or Firm* — CANTOR COLBURN LLP

(57) ABSTRACT

Embodiments of the disclosure provide an electric drive motor system that includes a stationary-side and a rotating-side. The stationary-side includes an only-stationary-side (OSS) compensation network. A first OSS compensation element of the OSS compensation network is operable to provide a rotating-side compensation function.

18 Claims, 13 Drawing Sheets

(56) References Cited

U.S. PATENT DOCUMENTS

| | | | | |
|---|---|---|---|---|
| 2011/0038190 | A1 | 2/2011 | Zimpfer | |
| 2012/0153904 | A1 | 6/2012 | Albsmeier | |
| 2014/0102202 | A1 | 4/2014 | Shibata et al. | |
| 2014/0266079 | A1 | 9/2014 | Rozman et al. | |
| 2016/0079862 | A1 * | 3/2016 | Stephens | H02M 3/3376 363/21.02 |
| 2017/0018974 | A1 | 1/2017 | Madawala et al. | |
| 2018/0131302 | A1 | 5/2018 | Frampton et al. | |
| 2018/0212463 | A1 | 7/2018 | Van Boheemen et al. | |
| 2019/0334391 | A1 | 10/2019 | Qi et al. | |
| 2020/0152369 | A1 | 5/2020 | Ha et al. | |
| 2020/0350111 | A1 | 11/2020 | Sizov et al. | |
| 2021/0035729 | A1 | 2/2021 | Ashizawa et al. | |
| 2021/0358686 | A1 * | 11/2021 | Raminosoa | H01F 38/18 |
| 2022/0306133 | A1 | 9/2022 | Shabestari et al. | |
| 2023/0344317 | A1 | 10/2023 | Mohammad et al. | |
| 2023/0344321 | A1 | 10/2023 | Mohammad et al. | |
| 2024/0355540 | A1 | 10/2024 | Mohammad et al. | |

FOREIGN PATENT DOCUMENTS

| | | | |
|---|---|---|---|
| JP | 2018121416 | A | 8/2018 |
| JP | 2019030058 | A | 2/2019 |
| JP | 2020089045 | A | 6/2020 |
| JP | 2021190485 | A | 12/2021 |
| KR | 20170047482 | A | 5/2017 |
| KR | 20210093822 | A | 7/2021 |
| WO | 9843258 | A2 | 10/1998 |
| WO | 2019053675 | A2 | 3/2019 |
| WO | 2023061992 | A1 | 4/2023 |

OTHER PUBLICATIONS

Bortis et al. "Analysis of rotary transformer concepts for high-speed applications." 2013 Twenty-Eighth Annual IEEE Applied Power Electronics Conference and Exposition (APEC). IEEE, 2013. 8 pages.

Di Gioia et al. "Design and demonstration of a wound field synchronous machine for electric vehicle traction with brushless capacitive field excitation." IEEE Transactions on Industry Applications 54.2 (2017): 1390-1403.

Ditze et al. "Inductive power transfer system with a rotary transformer for contactless energy transfer on rotating applications." 2016 IEEE International Symposium on Circuits and Systems (ISCAS). IEEE, 2016. 4 pages.

Haruna et al. "Enhanced rotary transformer-based field excitation system for wound rotor synchronous motor." 2019 IEEE Energy Conversion Congress and Exposition (ECCE). IEEE, 2019. 8 pages.

Haruna et al. "Modeling and steady-state analysis of a rotary transformer-based field excitation system for wound rotor synchronous machine." 2019 IEEE Transportation Electrification Conference and Expo (ITEC). IEEE, 2019. 8 pages.

Haruna et al. "Stability analysis and control of a rotary transformer-based synchronous motor field excitation system." 2019 IEEE International Electric Machines & Drives Conference (IEMDC). IEEE, 2019. 8 pages.

Illiano. "Design of a highly efficient brushless current excited synchronous motor for automotive purposes." Diss. ETH Zurich, 2014. 212 pages.

Krupp et al. "Rotary transformer design for brushless electrically excited synchronous machines." 2015 IEEE Vehicle Power and Propulsion Conference (VPPC). IEEE, 2015. 6 pages.

Raminosoa et al. "Contactless rotor excitation for traction motors." 2018 IEEE Energy Conversion Congress and Exposition (ECCE). IEEE, 2018. 6 pages.

Raminosoa et al. "Novel rotary transformer topology with improved power transfer capability for high-speed applications." IEEE Transactions on Industry Applications 56.1 (2019): 277-286.

Ross. "In Mahle's Contact-Free Electric Motor, Power Reaches the Motor Wirelessly." IEEE Spectrum. https://spectrum.ieee.org/mahles-electric-motor-says-look-ma-no-contacts (retrieved May 3, 2022). May 2021. 12 pages.

Stancu et al. "Separately excited synchronous motor with rotary transformer for hybrid vehicle application." IEEE Transactions on Industry Applications 54.1 (2017): 223-232.

Udema et al. "Rotary transformer for contactless excitation of synchronous machines fed through neutral conductor." 2019 IEEE International Electric Machines & Drives Conference (IEMDC). IEEE, 2019. 7 pages.

Vip et al. "Rotary transformer with ferrite core for brushless excitation of synchronous machines." 2016 XXII International Conference on Electrical Machines (ICEM). IEEE, 2016. 7 pages.

Weber et al. "Rotary transformer with electrical steel core for brushless excitation of synchronous machines." 2016 XXII International Conference on Electrical Machines (ICEM). IEEE, 2016. 6 pages.

Zhang et al. "Design, manufacture, and test of a rotary transformer for contactless power transfer system." IEEE Transactions on Magnetics 58.2 (2021): 1-6.

Zhang et al. "Modeling and analysis of series-none compensation for wireless power transfer systems with a strong coupling." IEEE Transactions on Power Electronics 34.2 (2018): 1209-1215.

International Search Report and Written Opinion mailed Aug. 11, 2023 in PCT/US2023/019664; 10 pages.

International Search Report and Written Opinion mailed Aug. 11, 2023 in PCT/US2023/019665; 9 pages.

International Search Report and Written Opinion mailed Aug. 16, 2023 in PCT/US2023/019663; 9 pages.

International Search Report and Written Opinion mailed Aug. 8, 2023 in PCT/US2023/019662; 9 pages.

* cited by examiner $$Z_{reflected} = \frac{-v_{oc1}}{i_1} = \frac{\omega^2 M^2}{Z_2} = \frac{\omega^2 M^2}{r_{L2} + j\omega L_2 + j\omega L_E + R_E} = \frac{Z_m^2}{Z_2}$$ Equation−1

$$i_{Lf1} = \frac{U_1}{Z_{in}}$$ Equation−2

$$Z_{in} = Z_{Lf1} + Z_{12}$$ Equation−3

$$Z_{12} = \frac{Z_{Cf1} Z_1}{Z_{Cf1} + Z_1} = \frac{(-Z_{Lf1}) Z_1}{(-Z_{Lf1}) + Z_1}$$ Equation−4

$$j\omega L_{f1} = \frac{1}{j\omega C_{f1}}$$ Equation−5

$$Z_1 = Z_{L1} + Z_{C1} + Z_{ref}$$ Equation−6

$$Z_1 = j\omega L_1 + \frac{1}{j\omega C_1} + \frac{\omega^2 M^2}{r_{L2} + j\omega L_2 + j\omega L_E + R_E}$$ Equation−7

FIG.8

$$i_1 = \frac{Z_{Cf1}}{Z_{Cf1} + Z_1} \cdot i_{Lf1}$$ Equation-8

$$i_{Cf1} = i_{Lf1} - i_1$$ Equation-9

$$v_{Cf1} = U_1 - j\omega L_{f1} i_{Lf1}$$ Equation-10

$$i_2 = \frac{j\omega M_{i1}}{Z_2} = \frac{j\omega M_{i1}}{r_{L2} + j\omega L_2 + j\omega L_E + R_E}$$ Equation-11

$$U_2 = i_2 (j\omega L_E + R_E)$$ Equation-12

$$P_2 = i_2^2 (j\omega L_E + R_E)$$ Equation-13

FIG.9

$$Z_2 = j\omega L_2 + R_E \quad \text{Equation-14}$$

$$Z_{reflected} = \frac{-v_{oc1}}{i_1} = \frac{\omega^2 M^2}{Z_2} = \frac{\omega^2 M^2}{j\omega L_2 + R_E} = \frac{\omega^2 M^2}{j\omega L_2 + R_E} \cdot \frac{R_E - j\omega L_2}{R_E - j\omega L_2} \quad \text{Equation-15A}$$

$$= \frac{\omega^2 M^2 R_E - j\omega L_2 \omega^2 M^2}{R_E^2 - j\omega L_2 R_E + j\omega L_2 R_E + \omega^2 L_2^2} = \frac{\omega^2 M^2 R_E - jL_2 \omega^3 M^2}{R_E^2 + \omega^2 L_2^2} \quad \text{Equation-15B}$$

$$Z_{reflected} = \frac{\omega^2 M^2 R_E}{R_E^2 + \omega^2 L_2^2} - j\frac{\omega^3 L_2 M^2}{R_E^2 + \omega^2 L_2^2} \quad \text{Equation-16}$$

FIG.10

$$jz_{\mathrm{b}} = j\omega L_1 + \frac{1}{j\omega C_1} \qquad \text{Equation-17}$$

$$jz_{\mathrm{a}} = j\omega L_{f1} = \frac{1}{j\omega C_{f1}} = j\omega L_{f1} + \frac{1}{j\omega C_1} + jZ_{ref} \qquad \text{Equation-18}$$

$$i_{Lf1} = \frac{U_1}{Z_{in}} = \frac{U_1}{jZ_a + Z_{12}} \qquad \text{Equation-19}$$

$$Z_{12} = \frac{-jZ_a(jZ_a + \mathrm{R}_e\{Z_{ref}\})}{-jZ_a + jZ_a + \mathrm{R}_e\{Z_{ref}\}} = \frac{Z_a^2 - jZ_a\frac{\omega^2M^2}{Z_2}}{\frac{\omega^2M^2}{Z_2}} = \frac{Z_a^2 - \frac{jZ_aZ_m^2}{Z_2}}{\frac{Z_{\mathrm{m}}^2}{Z_2}} \qquad \text{Equation-20}$$

$$Z_{12} = \frac{Z_a^2Z_2}{Z_m^2} - j\frac{Z_aZ_m^2}{Z_2}.\frac{Z_2}{Z_m^2} = \frac{Z_aZ_2}{Z_m^2} - jZ_a \qquad \text{Equation-21}$$

$$Z_{\mathrm{in}} = jZ_a + \frac{Z_a^2Z_2}{Z_m^2} - jZ_a = \frac{Z_a^2Z_2}{Z_m^2} \qquad \text{Equation-22}$$

$$i_{Lf1} = \frac{U_1}{\frac{Z_a^2Z_2}{Z_m^2}} = \frac{U_1Z_m^2}{Z_a^2Z_2} \qquad \text{Equation-23}$$

FIG.11

$$i_1 = \frac{-jZ_a}{-jZ_a + jZ_a + \frac{Z_m^2}{Z_2}} i_{lf1} = \frac{-jZ_a}{\frac{Z_m^2}{Z_2}} i_{Lf1} = \frac{-jZ_a Z_2}{Z_m^2} i_{Lf1} \quad \text{Equation-24}$$

$$i_1 = -\frac{jZ_a Z_2}{Z_m^2} \times \frac{U_1 Z_m^2}{Z_a^2 Z_2} = -\frac{jU_1}{Z_a} = -j\frac{U_1}{\omega L_{f1}} \quad \text{Equation-25}$$

$$j\omega L_{f1} = j\omega L_1 + \frac{1}{j\omega C_1} + jZ_{ref} = j\omega L_1 - j\frac{1}{\omega C_1} + jZ_{ref} = j\left(\omega L_1 - \frac{1}{\omega C_1} + \frac{L_2 \omega^3 M^2}{R_E^2 + \omega^2 L_2^2}\right) \quad \text{Equation-26}$$

$$\omega L_{f1} = \omega L_1 - \frac{1}{\omega C_1} + \frac{L_2 \omega^3 M^2}{R_E^2 + \omega^2 L_2^2} \quad \text{Equation-27}$$

$$\frac{1}{\omega C_1} = \omega L_1 - \omega L_{f1} - \frac{\omega^3 L_2 M^2}{R_E^2 + \omega^2 L_2^2} \quad \text{Equation-28}$$

FIG. 12

$$\frac{1}{C_1} = \omega \left(\omega L_1 - \omega L_{f1} - \frac{\omega^3 L_2 M^2}{R_E^2 + \omega^2 L_2^2}\right) = \omega^2 \left(L_1 - L_{f1} - \frac{\omega^2 L_2 M^2}{R_E^2 + \omega^2 L_2^2}\right) \quad \text{Equation-29}$$

$$C_1 = \frac{1}{\omega^2 \left(L_1 - L_{f1} - \frac{\omega^2 L_2 M^2}{R_E^2 + \omega^2 L_2^2}\right)} \quad \text{Equation-30}$$

$$L_1 - L_{f1} - \frac{\omega^2 L_2 M^2}{R_E^2 + \omega^2 L_2^2} > 0 \quad \text{Equation-31}$$

$$L_1 > L_{f1} + \frac{\omega^2 L_2 M^2}{R_E^2 + \omega^2 L_2^2} \quad \text{Equation-32}$$

$$G_v = \frac{v_2}{v_1} \quad \text{Equation-33}$$

FIG. 13

$$p_2 = |i_2^2 R_E| = \left(\frac{j\omega M i_1}{Z_2}\right)^2 R_E = \left|\left[\frac{-\omega^2 M^2 i_1^2}{(R_E + j\omega L_2)^2}\right] R_E\right| = \frac{\omega^2 M^2 R_E}{(R_E + j\omega L_2)^2} i_1^2 \quad \text{Equation-34}$$

$$p_2 = \frac{\omega^2 M^2 R_E}{(R_E + j\omega L_2)^2} \times \left[-j \frac{U_1}{\omega L_{f1}}\right]^2 \quad \text{Equation-35}$$

$$p_2 = \frac{\omega^2 M^2 R_E}{(R_E + j\omega L_2)^2} \times \frac{U_1^2}{\omega^2 L_{f1}^2} = \frac{M^2 R_E}{(R_E + j\omega L_2)^2} \times \frac{U_1^2}{L_{f1}^2} \quad \text{Equation-36}$$

FIG.14

$$L_{f1}^2 = \frac{M^2 U_1^2}{p_2} \frac{R_E}{(R_E + j\omega L_2)^2} \qquad \text{Equation-37}$$

$$L_{f1} = \left| \frac{M.U_1}{R_E + j\omega L_2} \right| \times \sqrt{\frac{R_E}{p_2}} \qquad \text{Equation-38}$$

$$L_{f1} = \left| \frac{M.U_1}{R_E + j\omega L_2} \times \frac{R_E - j\omega L_2}{R_E - j\omega L_2} \right| \times \sqrt{\frac{R_E}{p_2}} \qquad \text{Equation-39}$$

$$L_{f1} = \left| \frac{M.U_1.R_E - j\omega M L_2 U_1}{R_E^2 - j\omega L_2 R_E + j\omega L_2 R_E + \omega^2 L_2^2} \right| \times \sqrt{\frac{R_E}{p_2}} = \left| \frac{M.U_1.R_E - j\omega M L_2 U_1}{R_E^2 + \omega^2 L_2^2} \right| \times \sqrt{\frac{R_E}{p_2}} \qquad \text{Equation-40}$$

$$L_{f1} = \frac{1}{R_E^2 + \omega^2 L_2^2} \sqrt{(M U_1 R_E)^2 + (\omega M L_2 U_1)^2} \times \sqrt{\frac{R_E}{p_2}} \qquad \text{Equation-41}$$

$$L_{f1} = \frac{\sqrt{(M U_1 R_E)^2 + (\omega M L_2 U_1)^2}}{R_E^2 + \omega^2 L_2^2} \times \sqrt{\frac{R_E}{p_2}} \qquad \text{Equation-42}$$

$$L_{f1} = \sqrt{\frac{M^2 U_1^2}{R_E^2 + \omega^2 L_2^2} \times \frac{R_E}{p_2}} \qquad \text{Equation-43}$$

FIG. 15

ONLY-STATIONARY-SIDE COMPENSATION NETWORK

CROSS REFERENCE TO RELATED APPLICATIONS

This application claims the benefit of an earlier filing date from U.S. Provisional Application Ser. No. 63/333,790 filed Apr. 22, 2022, the entire disclosure of which is incorporated herein by reference.

STATEMENT OF FEDERAL SUPPORT

The Government has rights in this invention pursuant to Strategic Partnership Project Agreement NFE-21-08527.

BACKGROUND OF THE INVENTION

A wound-rotor synchronous machine (WRSM) is an electric motor having a rotor and a stator. The stator is the fixed part of the machine, and the rotor is the rotating part of the machine. The stator usually has a multi-phase winding, and the rotor is made with a field winding instead of permanent magnets. The rotor spins in a magnetic field, and the magnetic field can be produced by the windings or field coils. A field coil is an electromagnet used to generate a magnetic field in an electromagnetic machine, typically a rotating electrical machine such as a motor or generator. It includes a coil of wire through which a current flows. In the case of a machine with field coils, a current must flow in the coils to generate the field, otherwise no power is transferred to or from the rotor. The process of generating a magnetic field by means of an electric current is called excitation. Field coils yield the most flexible form of magnetic flux regulation and de-regulation, but at the expense of a flow of electric current.

Conventionally, the rotor winding of a WRSM can be powered or excited using a slip ring and brush assembly systems. However, slip ring and brush assembly systems have disadvantages, including being inefficient at high speeds, frequently requiring maintenance, and being lossy overall, especially at high speeds due to the high contact resistances between the brush and the slip ring.

To avoid the shortcomings of slip ring and brush assembly excitation methods, wireless (or contactless) excitation systems or wireless power transfer systems have been developed. In general, wireless power transfer can be implemented using various technologies to transmit energy by means of electromagnetic fields (EMFs) without a physical link. In a wireless power transfer system, a transmitter device, driven by electric power from a power source, generates a time-varying EMF, which transmits power via mutual inductance (M) across space to a receiver device. The receiver device uses M to extract power from the EMF and supply the extracted power to an electrical load. Wireless power transfer provides power to electrical devices/loads where interconnecting wires are inconvenient, hazardous, or not possible. Wireless power techniques mainly fall into two categories, near-field and far-field. In near-field techniques, the time-varying EMF is generated using a variety of techniques, including resonant inductive coupling. Resonant inductive coupling is the near-field wireless transfer of electrical energy between magnetically coupled coils that are part of a resonant circuit tuned to resonate at the same frequency as the driving frequency.

Rotary transformers (RTs) are a type of wireless power transfer system that can be used for the controlled wireless excitation of the rotor windings of a WRSM. An RT is performs the same general function as a conventional transformer in that both transfer electrical energy from one circuit to another at the same frequency but different voltages. A conventional transformer works on the principle of electromagnetic induction, i.e., the electromotive force is induced in the closed circuit due to the variable magnetic field around it. An RT differs from a conventional transformer in that the RT geometry is arranged so that the primary windings and the secondary windings can be rotated with respect to each other with negligible changes in the electrical characteristics. In a known configuration, the RT can be constructed by winding the primary and secondary windings into separate halves of a cup core. The concentric halves face each other, with each half mounted to one of the parts that rotate with respect to one another. Magnetic flux provides the coupling from one half of the cup core to the other across an air gap, providing the M that transfers energy from the RT's primary windings to its secondary windings.

Known approaches to using RT systems to provide excitation for a WRSM can include providing the RT system with a resonant tuning network, which is also known as a compensation network. A resonant tuning network can include circuit components (e.g., various combinations of resistors (R), inductors (L), and/or capacitors (C)) that enable the associated transformer to store oscillating electrical energy similar to a resonant circuit and thus function as a band pass filter, allowing frequencies near their resonant frequency to pass from the primary to secondary winding but blocking other frequencies. The amount of M between the primary and the secondary windings, together with the quality factor (Q factor) of the circuit, determines the shape of the frequency response curve. Resonant circuits are often called LC or LRC circuits because of the inductive, resistive, and capacitive components used to form the resonant circuit. In material science, every material has its own natural frequency. If the external vibration is equal to the natural frequency, resonance occurs. In electrical science, impedance of the inductors and capacitors depends on the frequency. Capacitive impedance is inversely proportional to frequency while inductive impedance is directly proportional to the frequency. At a particular frequency both cancel each other (or tune each other out). Such a circuit is called as resonant circuit, and that particular frequency is resonant frequency. Additionally, for LC circuits, where the reactance of the L component is substantially the same as the reactance of the C component, the L and C components cancel each other out, which means the L and C components compensate each other, or tune each other out.

In conventional RT systems that provide resonant tuning or compensation (i.e., a RT compensation system), the resonant tuning network (or compensation network) is provided on both the stationary (or stator, or primary) side and the rotating (or rotary, or secondary) side of the WRSM. For the primary coil, a basic function of "compensation" is minimizing the input apparent power and/or minimizing the voltage-ampere (VA) rating of the power supply. For the secondary coil, the compensation cancels the leakage inductance of the secondary coil in order to maximize the transfer capability.

RT compensation systems that provide resonant circuit components on both the stationary-side and the rotating-side of the WRSM have shortcomings. For example, it is difficult to place a resonant tuning network or compensation network on the rotating-side due to the very limited space and high-temperature operating conditions on the rotating-side that exceed the temperature rating of commercially available resonant tuning components such as capacitors. Moreover, having a resonant tuning capacitor on the rotating-side decreases mechanical reliability of the rotating part and increases the complexity, mechanical mass, and inertia of the rotating part, especially at high rotational speeds.

Accordingly, there is a need in the art to provide a compensation network for use in a RT system that provides the benefits of wireless power transfer without the difficulties associated with providing compensation components on a rotating-side of an electric motor such as a WFSM.

BRIEF DESCRIPTION OF THE INVENTION

Embodiments of the disclosure provide an electric drive motor system that includes a stationary-side and a rotating-side. The stationary-side includes an only-stationary-side (OSS) compensation network. A first OSS compensation element of the OSS compensation network is operable to provide a rotating-side compensation function.

Embodiments of the disclosure provide a method of fabricating an electric drive motor system that includes a stationary-side and a rotating-side. The stationary-side includes an OSS compensation network. A first OSS compensation element of the OSS compensation network is operable to provide a rotating-side compensation function.

BRIEF DESCRIPTION OF THE DRAWINGS

FIG. 8 depicts various equations that can utilized in designing an only-stationary-side compensation network in accordance with aspects of the disclosure;

FIG. 9 depicts various equations that can utilized in designing an only-stationary-side compensation network in accordance with aspects of the disclosure;

FIG. 10 depicts various equations that can utilized in designing an only-stationary-side compensation network in accordance with aspects of the disclosure;

FIG. 11 depicts various equations that can utilized in designing an only-stationary-side compensation network in accordance with aspects of the disclosure;

FIG. 12 depicts various equations that can utilized in designing an only-stationary-side compensation network in accordance with aspects of the disclosure;

FIG. 13 depicts various equations that can utilized in designing an only-stationary-side compensation network in accordance with aspects of the disclosure;

FIG. 14 depicts various equations that can utilized in designing an only-stationary-side compensation network in accordance with aspects of the disclosure; and FIG. 15 depicts various equations that can be utilized in designing an only-stationary-side compensation network in accordance with aspects of the disclosure.

DETAILED DESCRIPTION OF THE INVENTION

Figure 1:
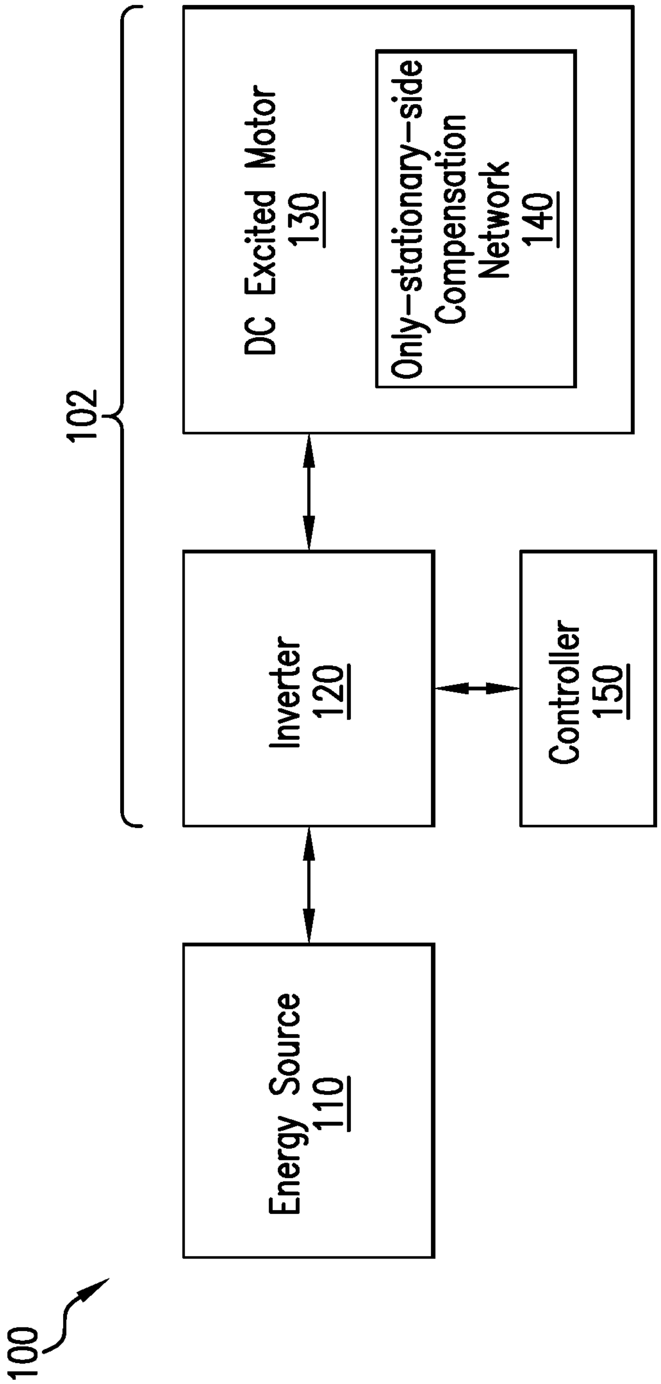
FIG. 1 is a simplified block diagram illustrating a non-limiting example of an electric drive motor system having an only-stationary-side compensation network in accordance with aspects of the disclosure.

Embodiments of the disclosure provide a RT compensation system having a novel only-stationary-side compensation network. In embodiments of the disclosure, the novel only-stationary-side compensation network can be incorporated within an electric motor drive system having an electric motor (e.g., a WRSM) operable to include a stationary-side and a rotating-side. The novel only-stationary-side compensation network disclosed herein addresses the previously-described difficulties associated with placing a resonant tuning network or compensation circuitry on the rotating/secondary side by providing by implementing the only-stationary-side compensation network as an only-stationary-side resonant LCC (inductor-capacitor-capacitor) network operable to provide tuning only on the stationary-side (or primary side) with no compensation elements (e.g., no resonant tuning capacitor element(s)) provided on the rotating-side (or secondary side) for RT compensation system applications. In embodiments described herein, the terms "only-stationary-side" applied to a compensation network implemented in an electric driver motor system having a stationary-side and a rotating-side means that no compensation components are provided on the rotating side. In embodiments of the disclosure, the need for compensation elements on the rotating-side is eliminated by configuring the only-stationary-side LCC network to perform a rotating-side compensation function, wherein rotating-side compensation is provided by one or more compensation elements of the only-stationary-side LCC network. For example, in some embodiments of the disclosure, the rotating-side compensation function includes determining a value or values of the one or more compensation elements of the only-stationary-side LCC network such that the one or more compensation elements on the stationary-side provide the compensation function for the rotating side.

In aspects of the disclosure, the previously-described electric motor drive system includes a resonant inverter operable to convert direct current (DC) (e.g., from a vehicle battery) to high frequency (HF) AC and provide the HF AC to the only-stationary-side resonant LCC network. The only-stationary-side resonant LCC network is designed in a manner that enables the only-stationary-side resonant LCC network to, in addition to providing the stationary-side compensation, also perform the rotating-side compensation function. The rotating side compensation function includes a novel design methodology that includes computing the "reflected" stationary-side coil impedance that is due to the impedance on the rotating-side coil of the electric motor. In general, a reflected impedance (or inductance) is the part of the impedance of a circuit (e.g., circuit A) that is due to the influence another coupled circuit (e.g., circuit B). The novel design methodology further includes selecting the location and component values of the only-stationary-side resonant LCC network such that the only-stationary-side resonant LCC network tunes the "reflected" stationary-side coil impedance that is due to the impedance on the rotating-side coil out of the only-stationary-side resonant LCC network. For example, with an appropriate location and sizing of a capacitive component (e.g., a capacitive element in series with the primary windings/coils) of the only-stationary-side resonant LCC network, the rotating-side windings of the electric motor can be tuned from the stationary-side through the appropriate location and sizing of the capacitive component (e.g., the $C_1$ capacitor shown in FIG. 2) of the only-stationary-side resonant LCC tuning network. The LCC tuning on the primary-side is configured and arranged such that constant current source behavior is achieved on the primary-side coil regardless of the load current or the coupling factor. Accordingly, the resonant inverter output current is directly related to a rectifier output current fed into the rotor windings on secondary-side. With no compensation (e.g., no resonant tuning capacitor(s)) on secondary-side, the tuning circuitry on secondary-side is simplified, the need to identify and provide a high-temperature rotating-side capacitor is eliminated, the cost associated with secondary-side tuning components is eliminated, and the overall reliability of the wireless motor excitation system is improved.

Turning now to a more detailed description of embodiments of the disclosure, FIG. 1 depicts a system 100 embodying aspects of the disclosure. The system 100 includes an energy source 110 electronically coupled to an electric motor drive system 102. The electronic motor drive system 102 includes a resonant inverter 120, a DC excited motor 130, and an inverter controller 150, configured and arranged as shown. In accordance with aspects of the disclosure, the DC excited motor 130 includes an only-stationary-side compensation network 140. Although the resonant inverter 120, the DC excited motor 130, the only-stationary-side compensation network 140, and the inverter controller 150 are depicted as separate components, it is understood that the resonant inverter 120, the DC excited motor 130, the only-stationary-side compensation network 140, and the inverter controller 150 can be configured and arranged in any suitable combination. For example, the inverter controller 150 can be incorporated within the resonant inverter 120; the resonant inverter 120 can be incorporated within the DC excited motor 130; and/or the resonant inverter 120 and the inverter controller 150 can be incorporated within the DC excited motor 130.

The energy source 110 can be implemented in a variety of forms, including, for example as a battery. In some embodiments of the disclosure, the battery can be a battery pack having a set of one or more individual battery cells connected in series or in parallel and that operate under the control of one or more controllers, such as a battery control module (BCM) that monitors and controls the performance of the battery pack. The BCM can monitor several battery pack level characteristics such as pack current measured by a current sensor, pack voltage, and pack temperature, for example. The battery pack can be recharged by an external power source (not shown). The battery pack can include power conversion electronics operable to condition the power from the external power source to provide the proper voltage and current levels to the battery pack. The individual battery cells within a battery pack can be constructed from a variety of chemical formulations. Battery pack chemistries can include, but are not limited, to lead acid, nickel cadmium (NiCd), nickel-metal hydride (NIMH), lithium-ion or lithium-ion polymer.

The resonant inverter 120 is electrically coupled between the energy source 110 and the DC excited motor 130 to transfer excitation energy from the energy source 110 to the DC excited motor 130. More specifically, the resonant inverter 120 is operable to provide energy from the energy source 110 to the only-stationary-side compensation network 140 of the DC excited motor 130 at a desired resonant frequency for purposes of providing excitation to the DC excited motor 130. In embodiments of the disclosure, the resonant inverter 120 is operable to convert the DC voltage from the energy source 110 to AC current at the desired resonant frequency as required by the DC excited motor 130 and the only-stationary-side compensation network 140 for motor excitation. In embodiments of the disclosure, the resonant inverter 120 can be a full-bridge resonant inverter having four switches organized as two "phase legs." Each phase leg can include two switches connected in series and between a positive DC rail and a negative DC rail. A phase node can be positioned between the two switches of each phase leg to provide the phases of an AC waveform output at a desired resonant frequency. In some embodiments of the disclosure, the resonant inverter 120 generates HF AC. The inverter controller 150 is electronically coupled to the phase leg switches to control the on/off states of the switches, thereby controlling the frequency and phase of the AC waveform generated by the resonant inverter 120. The inverter controller 150 includes a computing device (with memory), which includes a computer, a microprocessor, a digital signal processor, and the like, configured and operable to execute software commands and programs, and which can include associated firmware, such that the controller 150 is configured and operable to control the on/off switching operations of the resonant inverter 120.

The DC excited motor 130 can be any eclectic motor design that is suitable for the work to be performed by the motor. Examples of work that can be done by motors in conventional automobile-based motor applications include operating or moving power windows; power seats; fans for the heater and the radiator; windshield wipers; and/or the engine of a vehicle having a hybrid-electric vehicle configuration. Regardless of the type of the DC excited motor 130, it relies on electromagnetism and flipping magnetic fields to generate mechanical power. A conventional implementation of the DC excited motor 130 includes five basic parts, namely, a stator; a rotor; a solid axle; coils; and a so-called "squirrel cage." The winding of the stator in an DC excited motor is a ring of electromagnets that are paired up and energized in sequence, which creates the rotating magnetic field. The rotor in an DC excited motor does not have any direct connection to a power source, and it does not have brushes. Instead, it often uses the previously-described squirrel cage. The squirrel cage in a DC excited motor is a set of rotor bars connected to two rings, one at either end. The squirrel cage rotor goes inside the stator. When excitation power is sent through the stator, it creates an EMF. The bars in the squirrel cage rotor are conductors, so they respond to the flipping of the stator's poles, which rotates the rotor and creates its own magnetic field. The key to an induction motor, where the field of the rotor is induced by the field of the stator, is that the rotor is always trying to catch up. It is always looking for stasis, so it is rotating to find that steady state. However, the EMF produced by the stator is always going to be a little faster than the rotor's field. The spin of the rotor is creating the torque needed to create mechanical power to turn the wheels of a car or the blades of a fan. Some DC excited motors use a wound rotor (e.g., a WRSM), which is wrapped with wire instead of being a squirrel cage. In either case, there is only one moving part in a DC excited motor, which means there are fewer things that need to be replaced or maintained.

In some embodiments of the disclosure, the DC excited motor 130 can be a WRSM. A WRSM is a rotating electric motor having a rotor and a stator. The stator is the fixed part of the machine, and the rotor is the rotating part of the machine. The stator usually has a multi-phase winding, and the rotor is made with a field winding instead of permanent magnets. The rotor spins in a magnetic field, and the magnetic field can be produced by the windings or field coils. In the case of a machine with field coils, an excitation current must flow in the coils to generate the field, otherwise no power is transferred to or from the rotor. Field coils yield the most flexible form of magnetic flux regulation and de-regulation, but at the expense of a flow of electric current. Conventionally, the rotor winding of a WRSM can be powered or excited with a slip ring and brush assembly. However, slip ring and brush systems have disadvantages, including being inefficient at high speeds, frequently requiring maintenance, and being lossy overall, especially at high speeds due to the high contact resistances between the brush and the slip ring systems.

To avoid the shortcomings of slip ring and brush assembly excitation methods, the only-stationary-side compensation network 140 is incorporated within a RT compensation system (not shown separately from the motor 130) operable to provide compensated wireless excitation or wireless power transfer from a stator-side of the motor 130 to a rotor-side of the motor 130. In embodiments of the disclosure, the only-stationary-side compensation network 140 can be implemented as part of a specially designed only-stationary-side RT compensation system. In general, the RT is a circuit and method for wireless power transfer to the rotor windings of a WRSM for controlled excitation. An RT is essentially the same as a conventional transformer in that it transfers electrical energy from one circuit to another at the same frequency but different voltage. In general, a conventional transformer works on the principle of electromagnetic induction, i.e., the electromotive force is induced in the closed circuit due to the variable magnetic field around it. An RT differs from a conventional transformer in that the RT's geometry is arranged so that the primary windings and secondary windings can be rotated with respect to each other with negligible changes in the electrical characteristics. In a known configuration, the RT can be constructed by winding the primary and secondary windings into separate halves of a cup core. The concentric halves face each other, with each half mounted to one of the parts that rotate with respect to one another. Magnetic flux provides the coupling from one half of the cup core to the other across an air gap, providing the M that couples energy from the RT's primary windings to its secondary windings.

In conventional RT designs that provide resonant tuning or compensation (i.e., the RT compensation system), a resonant tuning network (or compensation network) is provided on both the stationary (or primary) side and the rotating (or secondary) side of the WRSM. RT designs that have resonant circuit components on both the stationary-side and the rotating side of the WRSM are difficult to implement. For example, it is difficult to, in practice, place a resonant tuning network or compensation circuitry on the secondary-side due to very limited rotor space and the high-temperature rotor operating conditions that exceed the temperature rating of commercially available compact capacitors. Moreover, having a resonant tuning capacitor on the secondary-side increases the complexity of the rotating part, increases the mechanical mass, increases the inertia, and reduces mechanical reliability, especially at high rotational speeds.

The only-stationary-side compensation network 140 addresses the difficulties associated with going beyond on-paper designs and computer simulations and actually implementing (i.e., building and using) conventional RT compensation system designs that include stationary-side and rotating-side compensation networks by providing the benefits of compensated RT functionality without the difficulties associated with providing compensation circuitry on a rotating-side of a DC excited motor 130 (e.g., a WFSM). More specifically, the only-stationary-side compensation network 140 is operable to assist with the delivery of rotor excitation current from the stationary-side to the rotating rotor wirelessly, thereby eliminating the brush and slip ring maintenance issues, as well as the inefficiencies, fabrication challenges, and design drawbacks associated with brush and slip ring systems.

In aspects of the disclosure, the only-stationary-side compensation network 140 accounts for having no resonant tuning capacitor on the secondary side by providing an extra resonant tuning capacitor (i.e., one of the resonant tuning capacitors of an LCC network implementation of the only-stationary-side compensation network 140) on the primary side and adjusting the two primary side resonant tuning capacitors so that the uncompensated secondary side doesn't impose inefficiencies or other drawbacks on the network 140. In embodiments of the disclosure, an only-stationary-side LCC design methodology is provided that includes reflecting the impendence and/or inductance of the secondary side to the primary side, and the leakage inductance of this secondary coil (e.g., $L_2$ shown in FIG. 2) is tuned on the primary side. In general, a reflected impedance (or inductance) is the part of the impedance of a circuit (e.g., circuit A) that is due to the influence another coupled circuit (e.g., circuit B). In embodiments of the disclosure, this can be accomplished by deriving the equivalent circuit models of the system 100, as well as the overall impedance model of the system 100, which allows the reflective impedance from the secondary to the primary to be computed. A further simplification is applied to the derived equivalent circuit models so the overall impedance seen by the resonant inverter 120 can be calculated. In order to tune this overall impedance to a unity power factor, a tuning capacitor (e.g., $C_1$ shown in FIG. 2) of the LCC design is recalculated. Thus, the only-stationary—side compensation network 140 eliminates the need for capacitor tuning on secondary side, and the need for a secondary side resonant tuning capacitor(s) and tuning thereof, by providing additional primary side tuning components (e.g., a resonant tuning capacitor(s)) and adjusting the values of the tuning components on the primary side. Additional details of the only-stationary-side LCC design and its associated design methodology in accordance with aspects of the disclosure are illustrated in FIGS. 3-15 and described subsequently herein.

Figure 2:
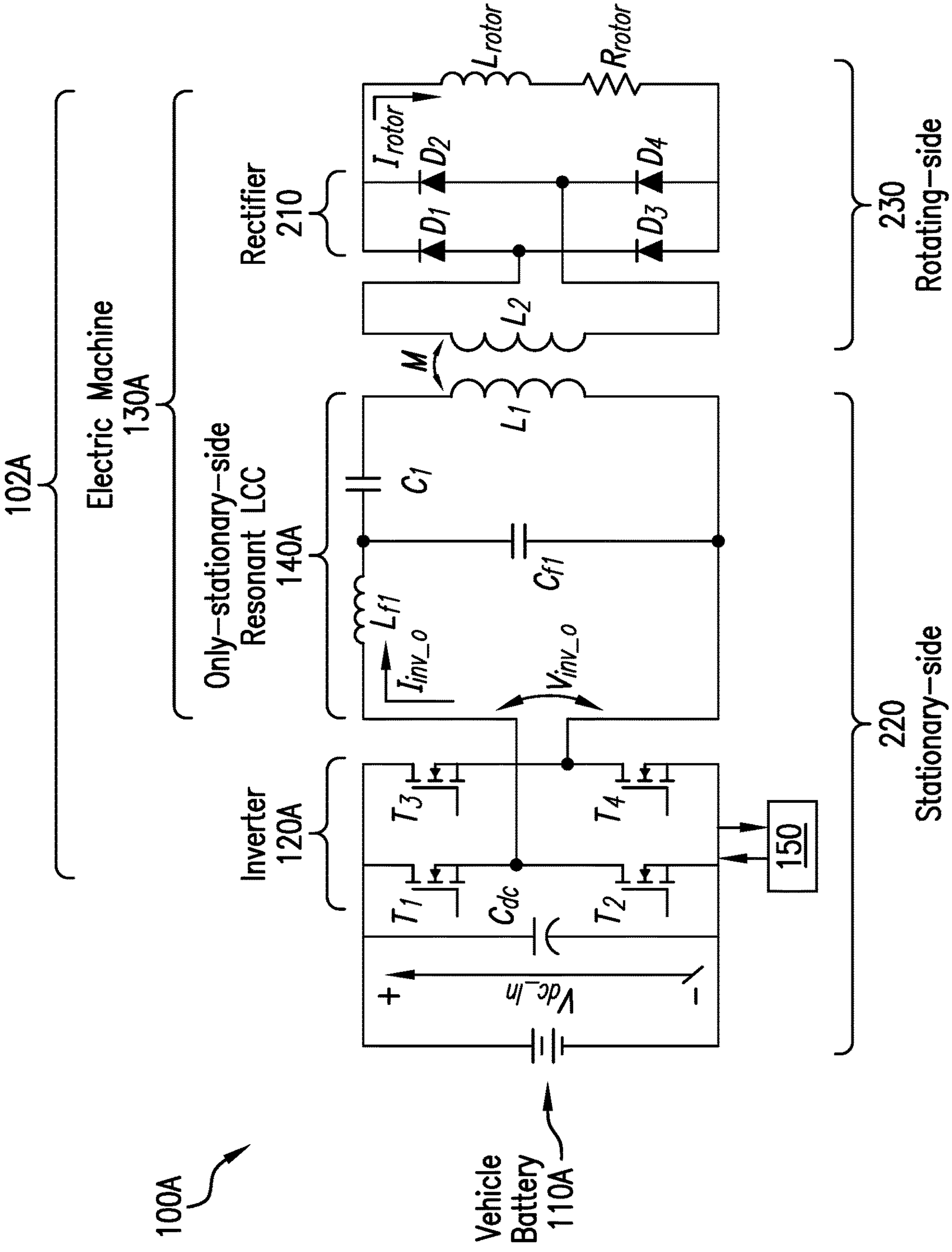
FIG. 2 is a simplified block diagram illustrating a non-limiting example of how the electric motor drive system shown in FIG. 1 can be implemented in accordance with aspects of the disclosure.

FIG. 2 depicts a system 100A having a vehicle battery 110A electronically coupled through a DC-link capacitor ($C_{dc}$) to an electric motor drive system 102A. The system 100A is a non-limiting example implementation of the system 100 (shown in FIG. 1); the vehicle battery 110A is a non-limiting example implementation of the energy source 110 (shown in FIG. 1); and the electric motor drive system 102A is a non-limiting example implementation of the electric motor drive system 102 (shown in FIG. 1). The electric motor drive system 102A can be implemented as a resonant inverter 120A electronically coupled to the inverter controller 150 and a simplified representation of an electric machine 130A. The resonant inverter 120A is a non-limiting example implementation of the inverter 120 (shown in FIG. 1). The electric machine 130A is an example implementation of the DC excited motor 130 (shown in FIG. 1). The electric machine 130A includes a novel only-stationary-side resonant LCC 140A, a rectifier 210, along with a rotor element represented by a rotor inductance $L_{rotor}$ and a rotor resistance $R_{rotor}$. The novel only-stationary-side resonant LCC 140A is a non-limiting example implementation of the novel only-stationary-side wireless power transfer network 140 (shown in FIG. 1). The system 100A includes a stationary-side (e.g., stator-side) 220 and a rotating-side (e.g., a rotor-side) 230. In general, the stationary-side 220 includes the stator windings $L_1$ and the circuit elements to the left thereof, and the rotating-side 230 include the stator windings $L_2$ and the circuit elements to the right thereof. Although the resonant inverter 120A, the electric machine 130A, and the inverter controller 150 are depicted as separate components, it is understood that the resonant inverter 120A, the electric machine 130A, and the inverter controller 150 can be configured and arranged in any suitable combination of components. For example, the inverter controller 150 can be incorporated within the resonant inverter 120A; the resonant inverter 120A can be incorporated within the electric machine 130A; and/or the resonant inverter 120A and the inverter controller 150 can be incorporated within the electric machine 130A.

Referring still to FIG. 2, the stationary-side 220 is configured to transfer power to the rotating-side 230 using inductive power transfer, and the rotating-side 230 is configured to receive power via inductive power transfer from the stationary-side 220. The stationary-side 220 includes a DC vehicle battery 110A, a DC link capacitor $C_{dc}$, a resonant inverter 120A, the only-stationary-side resonant LCC 140A, and the stator-side coil $L_1$. The resonant inverter 120A receives a DC input signal from the vehicle batter 110A and converts the DC input signal to an AC output signal at a desired resonant frequency. In some embodiments of the disclosure, the resonant inverter 120A is a full bridge inverter circuit operable to include four power electronics switching device $T_1$, $T_2$, $T_3$, $T_4$, configured and arranged as shown. The switching devices $T_1$, $T_2$, $T_3$, $T_4$ can be implemented in any suitable format, including but not limited to, metal oxide semiconductor field effect transistors (MOSFETs), BJTs, FETs, IGBTs, IGFETs, and the like. The inverter controller 150 is electrically coupled to each of the switching devices $T_1$, $T_2$, $T_3$, $T_4$ to control the switching operation of the resonant inverter 120A. The inverter controller 150 turns the switching devices $T_1$, $T_2$, $T_3$, $T_4$ on and off to generate the AC output signal $V_{inv\_0}$ at the desired resonant frequency. The inverter controller 150 includes a computing device (with memory), which includes a computer, a microprocessor, a digital signal processor, and the like, operable to execute software commands and programs, and which can include associated firmware, such that the controller 150 is configured and operable to control the on/off switching operations of the resonant inverter 120A.

The only-stationary-side resonant LCC 140A interconnects the resonant inverter 120A with the stator-side coil $L_1$. In the non-limiting example embodiment of the disclosure depicted in FIG. 2, the only-stationary-side resonant LCC 140A is configured to include a stator-side inductor $L_{fl}$, a stator-side series capacitor $C_1$ (in series with the stator-side coil $L_1$), and a stator-side parallel capacitor $C_{fl}$ (in parallel with the stator-side inductor $L_{fl}$). The stator-side series capacitor $C_1$ is serially coupled to a positive terminal of the stator-side coil $L_1$, and the stator-side parallel capacitor $C_{fl}$ is coupled in parallel with the stator-side coil $L_1$.

The rotating-side 230 includes a rotor-side coil $L_2$ electrically coupled to a rectifier 210. The rotor-side coil $L_2$ is sufficiently close to the stator-side coil $L_1$ to be within an EMF generated by the stator-side coil $L_1$ such that M is between the stator-side coil $L_1$ and the rotor-side coil $L_2$. The rotor-side coil $L_2$ uses M to generate an AC current, and the rectifier 210 converts the AC current to a DC current ($I_{rotor}$). In some embodiments of the disclosure, the rectifier 210 is a bridge rectifier circuit includes four diodes $D_1$, $D_2$, $D_3$, $D_4$. The DC current is provided to a rotor of the electric machine 130A. The rotor is represented in FIG. 2 as the inductor $L_{rotor}$ in series with the resistor $R_{rotor}$.

Energy is transferred through the M between the stator-side coil $L_1$ and the rotor-side coil $L_2$, any $L_1/L_2$ leakage inductance does not have a direct contribution to the active power transfer. Leakage inductance can be further undesirable because it causes the voltage to change with loading. In conventional approaches to decreasing leakage inductance and increasing M, a rotor-side compensation circuit (e.g., a rotor-side capacitive circuit/element) is provided on the rotating-side 230. However, for applications such as the system 100, 100A where the rotor-side rotates with respect to the stator-side, it is extremely difficult to fabricate a rotor having a rotor-side compensation circuit. Embodiments of the disclosure avoid the need for the rotor-side compensation circuit/element by configuring and arranging the only-stationary-side resonant LCC 140A such that compensation that would in conventional RT compensation designs be provided by a rotor-side compensation circuit/element on the rotating-side 230 is instead provided by the design and component values settings of the only-stationary-side resonant LCC 140A. Additional details of the only-stationary-side resonant LCC 140A design and its associated design methodology in accordance with aspects of the disclosure are illustrated in FIGS. 3-15 and described subsequently herein.

Figure 3:
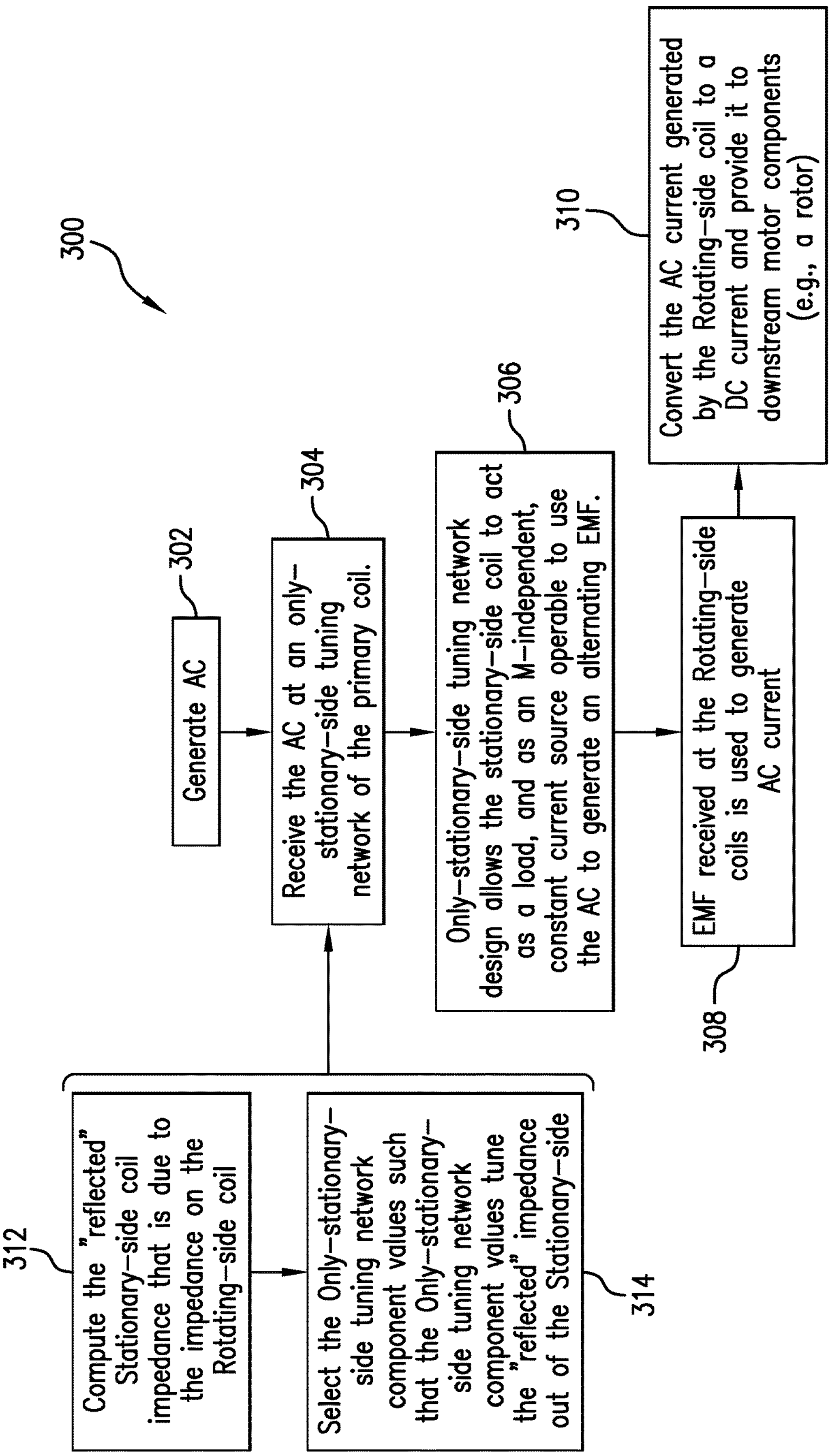
FIG. 3 is a simplified flow diagram illustrating a methodology in accordance with aspects of the disclosure.

FIG. 3 depicts a flow diagram illustrating a methodology 300 that can be performed by the system 100, 100A (shown in FIGS. 1 and 2). In some embodiments of the invention, portions of the methodology 300 (e.g., blocks 312, 314) can optionally be performed by a computer aided design (CAD) system running on a processor (e.g., having the same processor functionality as the controller 150) operable to perform computations, circuit modeling, and circuit simulation operations that can optionally be used to select the compensation component values of the only-stationary-side resonant LCC 140A. In accordance with aspects of the disclosure, the previously-described CAD system can be implemented using CAD software applications operable to optionally perform the various computations and algorithms illustrated and described in FIGS. 4-15. Although the description of the methodology 300 makes reference to components of the system 100A, the description applies equally to the corresponding element(s) of the system 100.

As shown in FIG. 3, the methodology 300 begins at block 302 by generating AC. In embodiments of the disclosure, the AC can be HF AC generated by using the resonant inverter 120A to convert DC received from the vehicle battery 110A to the HF AC. At block 304, the HF AC is received at the novel only-stationary-side compensation/tuning network (e.g., the only-stationary-side resonant LCC 140A) associated with the primary coils $L_1$.

Blocks 312 and 314 are offline operations that can be used to design the only-stationary-side tuning network (e.g., the only-stationary-side resonant LCC 140A) used at blocks 304, 306. At block 312, the "reflected" stationary-side coil impedance that is due to the impedance on the rotating-side coil is computed. In some embodiments of the invention, impedance associated with the rotating-side or primary coils is reflected to the stationary-side. In some embodiments of the invention, the impedances associated with the primary coils and the load (as represented by Lrotor and Rrotor in FIG. 2) are reflected to the station-side. At block 314, the location and components values of the only-stationary-side tuning network are selected such that the only-stationary-side tuning network tunes the "reflected" stationary-side coil impedance that is due to the impedance on the rotating-side coil out of the only-stationary-side tuning network. For example, with an appropriate location and sizing of a capacitive component (e.g., the $C_1$ capacitor) of the only-stationary-side tuning network, the rotating-side winding (e.g., $L_2$) can be tuned from the stationary-side through the appropriate location and sizing of the capacitive component (e.g., the $C_1$ capacitor) of the only-stationary-side tuning network. Additional details of how blocks 312 and 314 can be implemented are depicted in FIGS. 4-15 and described in greater detail subsequently herein.

Subsequent to the operations at block 304, the methodology 300 moves to block 306. At block 306, the only-stationary-side tuning network design has compensation components (e.g., two capacitive elements $C_1$, $C_{fl}$) and computed compensation component values that enable the only-stationary-side tuning network to act as a load, and further act as an M-independent, constant current source operable to use the AC received at block 304 to generate an alternating EMF. With this property of the only-stationary-side tuning network (e.g., the only-stationary-side resonant LCC 140A), the stationary-side coil (e.g., $L_1$) current does not depend on the rotor current ($I_{rotor}$) or the relative position of the stationary-side coils (e.g., $L_1$) and the rotating-side coil ($L_2$). As a result, the AC generated at block 302 (e.g., by the resonant inverter 120A) has an output current root mean square (RMS) value (which would have active and reactive components) that is directly related to the output current of the only-stationary-side tuning network. The resulting high M value and large $L_{rotor}$ inductance, eliminate the need for a rotating-side tuning network. The inductance of the rotating-side inductor ($L_2$) can be referred or reflected to the stationary-side, and with an appropriate location and sizing of a capacitive component (e.g., the $C_{fl}$ capacitor) of the only-stationary-side tuning network, the rotating-side winding (e.g., $L_2$) can be tuned from the stationary-side (e.g., through the appropriate location and sizing of the capacitive component (e.g., the Cfl capacitor) of the only-stationary-side tuning network). The resulting system 100, 100A is also insensitive to the $L_{rotor}$ inductance because this rotor winding inductance is on the DC side (i.e., downstream from the rectifier 210 shown in FIG. 2), and an inductor in steady-state operates as a short circuit under DC voltages and currents. Thus the $L_{rotor}$ only introduces a time-constant when the current changes from one value to another. Other than introducing a time constant (inertia to the change of the current), $L_{rotor}$ is not reflected to the input of the rectifier input 210 and to the stationary-side 220.

Subsequent to the operations at block 306, the methodology 300 moves to block 308. At block 308, the alternating EMF generated in the rotating-side coil ($L_2$) generates M between $L_1$ and $L_2$, and the rotating-side coil ($L_2$) uses M to generate AC charging current. At block 310, the AC charging current is converted to a DC current and provided to downstream motor components (e.g., a rotor, represented in FIG. 2 as $L_{rotor}$ and $R_{rotor}$).

Figure 4:
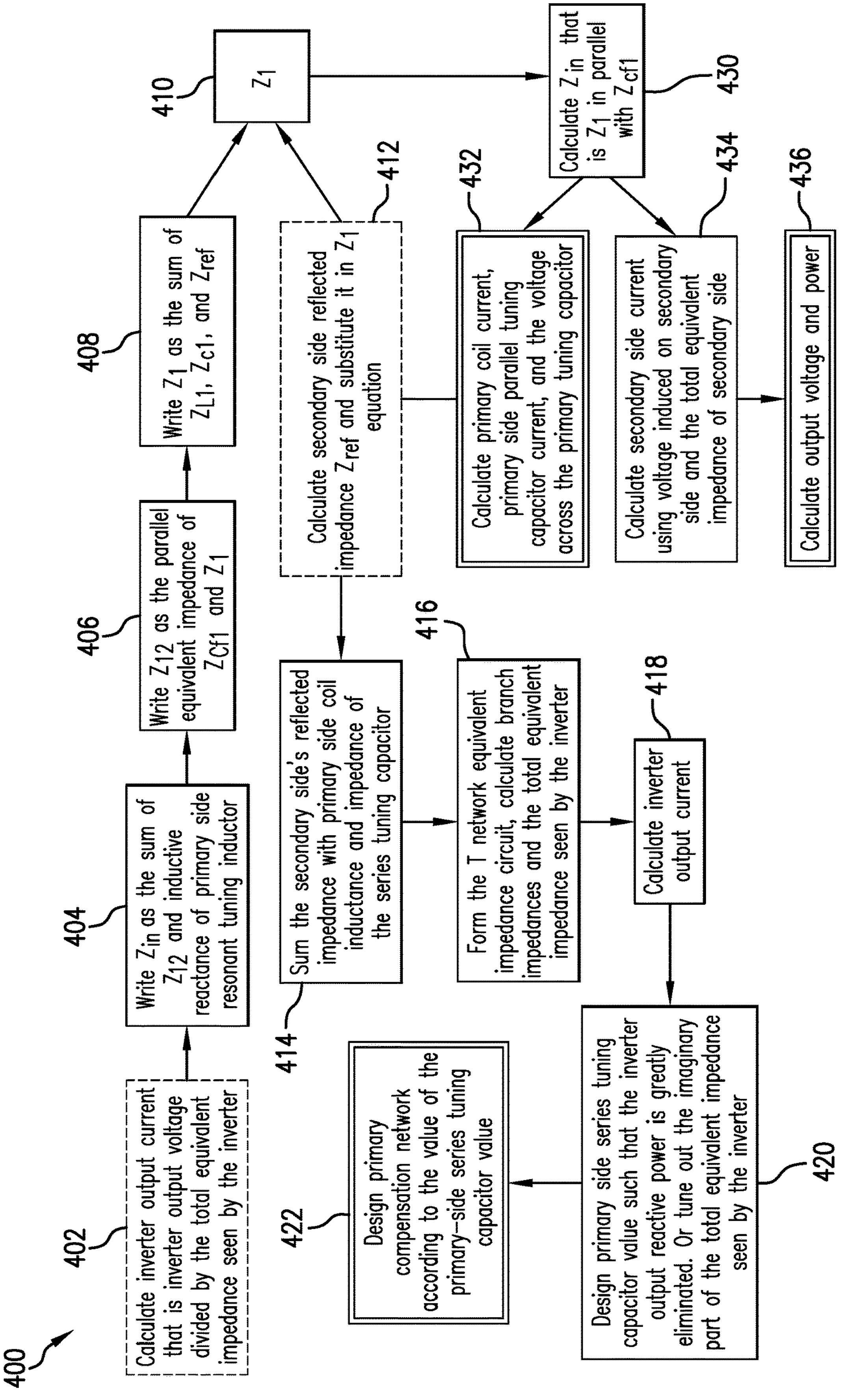
FIG. 4 is a simplified flow diagram illustrating a methodology in accordance with aspects of the disclosure.
Figure 5:
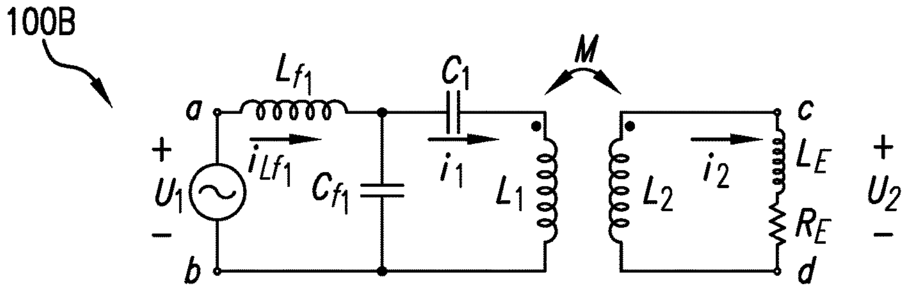
FIG. 5 is a simplified block diagram illustrating an equivalent circuit representation of the electric drive motor systems shown in FIGS. 1 and 2.
Figure 6:
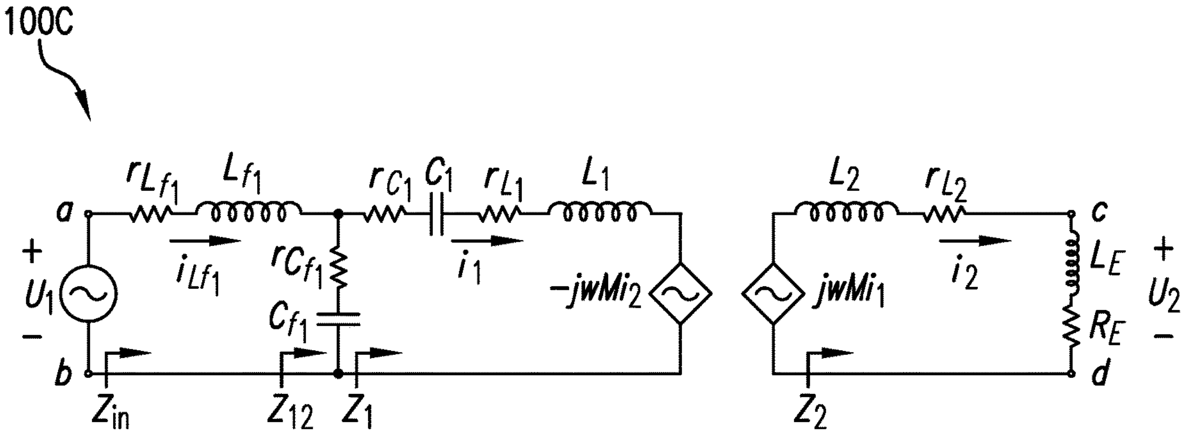
FIG. 6 is a simplified block diagram illustrating a further equivalent circuit representation of the electric drive motor systems shown in FIGS. 1 and 2.
Figure 7:
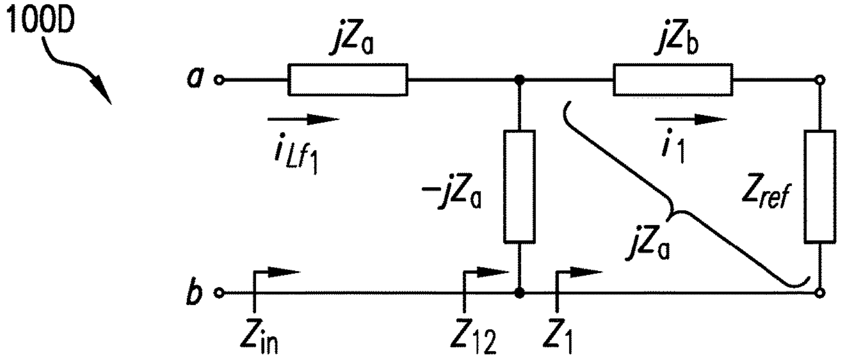
FIG. 7 is a simplified block diagram illustrating a further equivalent circuit representation of the electric drive motor systems shown in FIGS. 1 and 2.

FIGS. 4-15 depict a more detailed example of a design methodology for determining the component values of the only-stationary-side resonant LCC 140A for the system 100A that eliminates the need for compensation circuitry and/or compensation components on the rotating-side 230. More specifically, FIG. 4 depicts a design methodology 400 in accordance with embodiments of the disclosure; FIGS. 5-7 depict equivalent circuits and circuit models (systems 100B, 100C, 100D) used in one or more design methodologies in accordance with embodiments of the disclosure; and FIGS. 8-15 depict various equations (Equations 1-43) used in one or more design methodologies in accordance with embodiments of the disclosure.

Turning to FIG. 4, the methodology 400 will be described with reference to some of the component element labels (e.g., $L_{fl}$, $C_1$, $C_{fl}$, $L_1$, $L_2$, etc.) used in the equivalent circuits and circuit models (systems 100B, 100C, 100D) depicted in FIGS. 5-7. As shown in FIG. 4, the methodology 400 is operable to begin, in parallel, at blocks 402 and 412 then move through multiple paths to generate the outputs at blocks 432 (the primary coil current, primary side parallel tuning capacitor current, and the voltage across the primary tuning capacitor), 436 (output voltage and power), 422 (design of the primary compensation network according to the value of the primary-side series tuning capacitor ($C_1$) value). At block 402, the methodology 400 calculates the primary coil current, primary side parallel tuning capacitor current, and the voltage across the primary tuning capacitor. At block 404, the methodology 400 writes $Z_{in}$ as the sum of $Z_{12}$ and the inductive reactance of the primary side resonant tuning inductor ($L_{fl}$). At block 406, the methodology 400 writes $Z_{12}$ as the parallel equivalent impedance of $Z_{cfl}$ and $Z_1$. In embodiments of the disclosure, $Z_1$ is the total equivalent impedance seen by the inverter. At block 408, the methodology 400 writes $Z_1$ as the sum of $Z_{L1}$, $Z_{c1}$, and $Z_{ref}$ (Equation-6 in FIG. 8), then provides $Z_1$ to block 410. Substantially in parallel with the operations at blocks 402-408, block 412 calculates the secondary side (i.e., the rotating-side) reflected impedance $Z_{ref}$ and substitutes it in the $Z_1$ equation (Equation-6 in FIG. 8) at block 410.

Block 412 also provides its output to block 414. At block 414, the methodology 400 sums the secondary side's reflected impedance with the primary side coil inductance and the impedance of the series tuning capacitor. At block 416, the methodology 400 forms the T network equivalent impedance circuit, calculates branch impedances and the total equivalent impedance seen by the inverter. At block 418, the methodology 400 calculates the inverter output current. At block 420, the methodology 400 designs the primary side series tuning capacitor value such that the inverter output reactive power is greatly eliminated. Alternatively, block 420 can tune out the imaginary part of the total equivalent impedance seen by the inverter. At block 422, the methodology 422 designs the primary compensation network according to the value of the primary-side series tuning capacitor ($C_1$) value.

Returning to block 410, from block 410, the methodology 400 moves to block 430 and calculates $Z_{in}$ that is $Z_1$ in parallel with $Z_{in}$. The calculation performed in block 430 is provided to block 432 and block 434. At block 432, the methodology 400 calculates the primary coil current, the primary side parallel tuning capacitor current, and the voltage across the primary tuning capacitor. At block 434, the methodology 400 calculates the secondary side current using voltage induced on the secondary side, along with the total equivalent impedance of the secondary side. The calculations performed at block 434 are provided to block 436 where the methodology 400 calculates the output voltage and power.

Turning now to a more detailed discussion of the equivalent circuits and circuit models (systems 100B, 100C, 100D) depicted in FIGS. 5-7, along with the various equations (Equations 1-43) depicted in FIGS. 8-15, FIG. 5 depicts the equivalent circuit of the system 100, 100A with a first harmonic approximation (FHA), and FIG. 6 depicts the mutually coupled circuit model of the system 100, 100A with series equivalent internal resistances for circuit components. In FIG. 6, the primary and secondary coil self-inductances are used while the magnetizing branch uses current dependent voltage sources to model the effect of the mutual coupling between the primary and secondary windings. With no resonant tuning circuitry implemented on the secondary-side, the equivalent impedance of the secondary-side can be reflected at the primary-side using Equation-1 (shown in FIG. 8). The input current to the primary side (which is the inverter output current) can be expressed by Equation-2 (shown in FIG. 8), where the input impedance (Zin) or the total impedance seen by the inverter is shown by Equation-3 (shown in FIG. 8). The $Z_{12}$ component of Equation-3 is provided by Equation-4 (shown in FIG. 8). Because $L_{fi}$ is tuned out with $C_{fi}$, this implies Equation-5 (shown in FIG. 8). At the same time, the $Z_1$ impedance is given by Equation-6 (shown in FIG. 8), where $Z_{ref}$ is the reflected impedance from the secondary side, which can be written by Equation-7 (shown in FIG. 8).

The primary coil current can be expressed by Equation-8 (shown in FIG. 9), and the primary side parallel tuning capacitor's ($C_1$) current is given by Equation-9 (shown in FIG. 9), and the voltage is given by Equation-10 (shown in FIG. 9). The Secondary coil current would be a function of the voltage induced on the secondary-side and the total equivalent impedance of the secondary-side, which is given by Equation-11 (shown in FIG. 9). The voltage across the output is given by Equation-12 (shown in FIG. 9), and the power at the output can be calculated using Equation-13 (shown in FIG. 9).

To design the only-stationary-side resonant LCC 140A, the equivalent internal series resistances can be assumed to be zero, and the output load can be considered as resistive because the rotor winding inductance is on the DC side (i.e., downstream from the rectifier 210) and has no impact on the system's steady-state operation. Under these considerations, the secondary-side total equivalent impedance is given by Equation-14 (shown in FIG. 10), and the reflected impedance from the secondary side to the primary side is given by Equation-15A, Equation-15B, and Equation-16 (shown in FIG. 10).

For designing the parameters of the only-stationary-side resonant LCC 140A on the primary-side, this reflected impedance from the secondary-side should also be taken into account because the secondary coil inductance is not tuned out on secondary-side. Therefore, the T network of the only-stationary-side resonant LCC 140A with all equivalent impedances can be re-drawn with the inclusion of $Z_{ref}$ impedance reflected from the secondary-side. Accordingly, the equivalent T circuit model of the only-stationary-side resonant LCC 140A can be illustrated as the system 100D shown in FIG. 7. For the system 100D, the impedance $j_{Zb}$ and $j_{Za}$ are represented by Equation-17 (shown in FIG. 11) and Equation-18 (shown in FIG. 11), respectively. As a result, the input current $i_{Lfi}$ is determined using Equation-19 (shown in FIG. 11), and the $Z_{12}$ component of Equation-19 is determined using Equation-20 (shown in FIG. 11) and Equation-21 (shown in FIG. 11). As a result, the input impedance (as seen by the inverter 120A) of the only-stationary-side resonant LCC 140A becomes $Z_{in}$ as shown by Equation-22 (shown in FIG. 11). As a result, the input current $i_{Lfi}$ can be expressed by Equation-23 (shown in FIG. 11). The primary coil current ii is given as Equation-24 (shown in FIG. 12), and the input current can be simplified using Equation 25 (show in FIG. 12). The primary compensation capacitor must eliminate the reactive power such that Equation-26 (shown in FIG. 12), Equation-27 (shown in FIG. 12), Equation-28 (shown in FIG. 12), and Equation-29 (shown in FIG. 13). Accordingly, the value of the only-stationary-side tuning capacitor $C_1$ is given by Equation 30 (shown in FIG. 30). Additionally, it is noted that the value of $C_1$ cannot be negative. Thus, the expression for the $C_1$ capacitor should satisfy the condition set forth in Equation-31 (shown in FIG. 13) and/or the condition set forth in Equation-32 (shown in FIG. 13). Consequently, the values of the self inductances $L_1$ and $L_2$ can be designed based on the DC voltage gain that is given by Equation-33 (shown in FIG. 13). In order to design the input inductor of $L_{fi}$, first the output power can be expressed by Equation-34 (shown in FIG. 14), Equation-35 (shown in FIG. 14), and Equation-36 (shown in FIG. 14). Solving Equation-36 (shown in FIG. 14) for $L_{fi}$ can be accomplished using Equations-37 (shown in FIG. 15) through Equation-42 (shown in FIG. 15) to arrive at Equation-43 (shown in FIG. 15).

Accordingly, it can be seen from the foregoing description of FIGS. 3-15 that the only-stationary-side resonant LCC 140A provides technical effects and technical benefits. Although $C_1$ is on the stationary-side 230, $C_1$ performs a rotating-side compensation function operable to provide compensation for the $L_2$ windings on the rotating-side. This rotating-side compensation function can be accomplished by reflecting the $L_2$ impedance to the stationary-side 220, then using the various computations shown in FIGS. 8-15 to use the reflected impedance as part of the process to develop the value for $C_1$. In some embodiments of the invention, the impedances associated with the primary coils $L_2$ and the load (as represented by $L_{rotor}$ and Lot, in FIG. 2) are reflected to the station-side and used to develop the values for $C_1$. In some embodiments of the disclosure, in addition to compensating for the $L_2$ windings from stationary-side 220, $C_1$ also compensates a portion of $L_1$, or the difference between $L_1$ and $L_{fi}$, collectively. Thus, in some embodiments of the disclosure, the value of $C_1$ depends on $L_1$ and $L_{fi}$. $C_{fi}$ is used to "tune out" $L_{fi}$, which provides at least a portion of the compensation for the $L_1$ windings on the stationary-side 220.

The various components/modules of the systems illustrated herein are depicted separately for ease of illustration and explanation. In embodiments of the disclosure, the functions performed by the various components/modules/models can be distributed differently than shown without departing from the scope of the various embodiments of the disclosure describe herein unless it is specifically stated otherwise.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric drive motor system comprising:
a stationary-side; and
a rotating-side;
wherein the stationary-side comprises an only-stationary-side (OSS) compensation network;
wherein one or more features of a first OSS compensation element of the OSS compensation network are selected and configured to provide, from the stationary-side, a rotating-side compensation function;
wherein the one of more features comprise a value of the first OSS compensation element;
wherein the value is selected such that the first OSS compensation element contributes to the rotating-side compensation function; and
wherein the value is further selected based on a reflected stationary-side coil impedance that is due to an impedance on a rotating-side coil of the rotating-side, such that the OSS compensation network tunes the reflected stationary-side coil impedance that is due to the impedance on the rotating-side coil out of the OSS compensation network to provide, from the stationary-side, the rotating-side compensation function.

2. The system of claim 1, wherein:
a second OSS compensation element of the OSS compensation network is operable to provide a stationary-side compensation function; and
a value of the second OSS compensation element is selected such that the value of the second OSS compensation element contributes to the stationary-side compensation function.

3. They system of claim 2, wherein a third OSS compensation element of the OSS compensation network is operable to further contribute to the stationary-side compensation function.

4. The system of claim 3, wherein a value of the third OSS compensation element is selected such that the value of the third OSS compensation element contributes to the stationary-side compensation function.

5. The system of claim 1, wherein the first OSS compensation element comprises a first OSS capacitive compensation element.

6. The system of claim 2, wherein:
the first OSS compensation element comprises a first OSS capacitive compensation element; and
the second OSS compensation element comprises a second OSS capacitive compensation element.

7. The system of claim 4, wherein:
the first OSS compensation element comprises a first OSS capacitive compensation element;
the second OSS compensation element comprises a second OSS capacitive compensation element; and
the third OSS compensation element comprises an OSS inductive compensation element.

8. The system of claim 1, wherein:
the stationary-side comprises a stator having stationary-side windings;
the rotating-side comprises a rotor having rotating-side windings;
the stationary-side windings are operable to wirelessly transfer alternating current (AC) excitation signals to the rotating-side windings;
the OSS compensation network is operable to provide excitation signals to the stationary-side windings;
the rotating-side compensation function is applied to the wireless transfer of the AC excitation signals to the rotating-side windings;

the first OSS compensation element comprises a first OSS capacitive compensation element;

the OSS compensation network further comprises an inductive element coupled through a node that branches to a capacitive element and the first OSS capacitive compensation element; and the first OSS capacitive compensation element is serially coupled to the stationary-side windings.

9. The system of claim 1, wherein the compensation network comprises an inductor-capacitor-capacitor (LCC) network.

10. The system of claim 1, wherein the rotating-side does not include a compensating network.

11. A method of fabricating an electric drive motor system, the method comprising:

forming a stationary-side; and forming a rotating-side;

wherein the stationary-side comprises an only-stationary-side (OSS) compensation network; and wherein one or more features of a first OSS compensation element of the OSS compensation network are selected and configured to provide, from the stationary-side, a rotating-side compensation function;

wherein the one or more features comprise a value of the first OSS compensation element;

wherein the value is selected such that the first OSS compensation element contributes to the rotating-side compensation function; and wherein the value is further selected such that the first OSS compensation element contributes to substantially all of the rotating side compensation function that is provided to the rotating side.

12. The method of claim 11, wherein:

a second OSS compensation element of the OSS compensation network is operable to provide a stationary-side compensation function; and a value of the second OSS compensation element is selected such that the value of the second OSS compensation element contributes to the stationary-side compensation function.

13. They method of claim 12, wherein a third OSS compensation element of the OSS compensation network is operable to further contribute to the stationary-side compensation function.

14. The method of claim 13, wherein a value of the third OSS compensation element is selected such that the value of the third OSS compensation element contributes to the stationary-side compensation function.

15. The method of claim 11, wherein the first OSS compensation element comprises a first OSS capacitive compensation element.

16. The method of claim 12, wherein:

the first OSS compensation element comprises a first OSS capacitive compensation element; and the second OSS compensation element comprises a second OSS capacitive compensation element.

17. The method of claim 14, wherein:

the first OSS compensation element comprises a first OSS capacitive compensation element;

the second OSS compensation element comprises a second OSS capacitive compensation element; and the third OSS compensation element comprises an OSS inductive compensation element.

18. The method of claim 11, wherein:

the stationary-side comprises a stator having stationary-side windings;

the rotating-side comprises a rotor having rotating-side windings;

the stationary-side windings are operable to wirelessly transfer alternating current (AC) excitation signals to the rotating-side windings;

the OSS compensation network is operable to provide excitation signals to the stationary-side windings;

the rotating-side compensation function is applied to the wireless transfer of the AC excitation signals to the rotating-side windings;

the first OSS compensation element comprises a first OSS capacitive compensation element;

the OSS compensation network further comprises an inductive element coupled through a node that branches to a capacitive element and the first OSS capacitive compensation element; and the first OSS capacitive compensation element is serially coupled to the stationary-side windings.

* * * * *